United States Patent
Wilkinson et al.

(10) Patent No.: US 10,706,244 B2
(45) Date of Patent: Jul. 7, 2020

(54) SYSTEM AND METHOD FOR RECONCILING RFID READ LOCATIONS

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/100,469

(22) Filed: Aug. 10, 2018

(65) Prior Publication Data
US 2019/0050613 A1 Feb. 14, 2019

Related U.S. Application Data

(60) Provisional application No. 62/544,087, filed on Aug. 11, 2017.

(51) Int. Cl.
*G06K 7/10* (2006.01)
*G06Q 10/08* (2012.01)

(52) U.S. Cl.
CPC ....... *G06K 7/10475* (2013.01); *G06Q 10/087* (2013.01)

(58) Field of Classification Search
CPC ............. G06K 7/00; G06K 7/08; G06K 7/081
USPC ................................ 235/451, 439, 375, 487
See application file for complete search history.

(56) References Cited

U.S. PATENT DOCUMENTS

| 5,617,100 | A | 4/1997 | Akiyoshi | |
|---|---|---|---|---|
| 6,496,806 | B1 * | 12/2002 | Horwitz | G06K 17/0029 705/28 |
| 7,588,185 | B2 | 9/2009 | Berquist | |
| 8,947,213 | B2 | 2/2015 | Woo | |
| 9,076,119 | B2 | 7/2015 | Jain | |
| 9,367,785 | B2 | 6/2016 | Sabesan | |
| 10,346,659 | B1 * | 7/2019 | Ahmed | G06K 7/1097 |

(Continued)

FOREIGN PATENT DOCUMENTS

WO 2005071597 8/2005

OTHER PUBLICATIONS

PCT; App. No. PCT/US2018/045906; International Search Report and Written Opinion dated Oct. 10, 2018.

*Primary Examiner* — Edwyn Labaze
(74) *Attorney, Agent, or Firm* — Fitch, Even, Tabin & Flannery LLP

(57) ABSTRACT

In some embodiments, apparatuses and methods are provided herein useful to monitoring locations of products in a facility. In some embodiments, a system comprises a plurality of RFID readers placed at predetermined locations about the facility, a plurality of RFID tags, wherein the RFID tags are associated with products, and a control circuit configured to receive, from one or more of the plurality of RFID readers, an indication of an RFID read, determine, based on the indication of the RFID read, a product associated with the RFID read and a location of the product, compare the location of the product with locations of previous reads of a same type of item as the product, determine, based upon the locations of previous reads of the same type of item as the product, if the location of the product consistent with the location of the previous reads.

19 Claims, 3 Drawing Sheets

(56) References Cited

U.S. PATENT DOCUMENTS

| | | |
|---|---|---|
| 2008/0231431 A1* | 9/2008 | Stawar .................. B62B 3/1408 |
| | | 340/425.5 |
| 2011/0050396 A1 | 3/2011 | Chaves |
| 2014/0084060 A1 | 3/2014 | Jain |
| 2015/0065159 A1 | 3/2015 | Alpert |
| 2016/0003930 A1 | 1/2016 | Swope |
| 2016/0003932 A1 | 1/2016 | Whitney |
| 2017/0061171 A1 | 3/2017 | Lombardi |

* cited by examiner

SYSTEM AND METHOD FOR RECONCILING RFID READ LOCATIONS

CROSS-REFERENCE TO RELATED APPLICATION

This application claims the benefit of U.S. Provisional Application No. 62/544,087, filed Aug. 11, 2017, which is incorporated by reference in its entirety herein.

TECHNICAL FIELD

This invention relates generally to inventory management and, more specifically, to inventory management using radio frequency identification (RFID) technology.

BACKGROUND

Inventory management is an important aspect of day-to-day operations for retailers. With radio frequency identification (RFID) technology, inventory management tasks can be performed quickly and accurately. Additionally, RFID signals received from RFID tags associated with products can be used to determine locations of the products within the retail facility. Unfortunately, the ability to determine locations of products based on RFID signals can be hindered by obstacles within the retail facility. For example, certain structures may block and/or reflect RFID signals. These structures in the retail facility can make it difficult to accurately determine a location of a product. Consequently, a need exists for systems and methods to overcome the difficulties in accurately determining the locations of products in a retail facility based on RFID signals.

BRIEF DESCRIPTION OF THE DRAWINGS

Disclosed herein are embodiments of systems, apparatuses and methods pertaining to monitoring locations of products in a facility. This description includes drawings, wherein.

Figure 1:
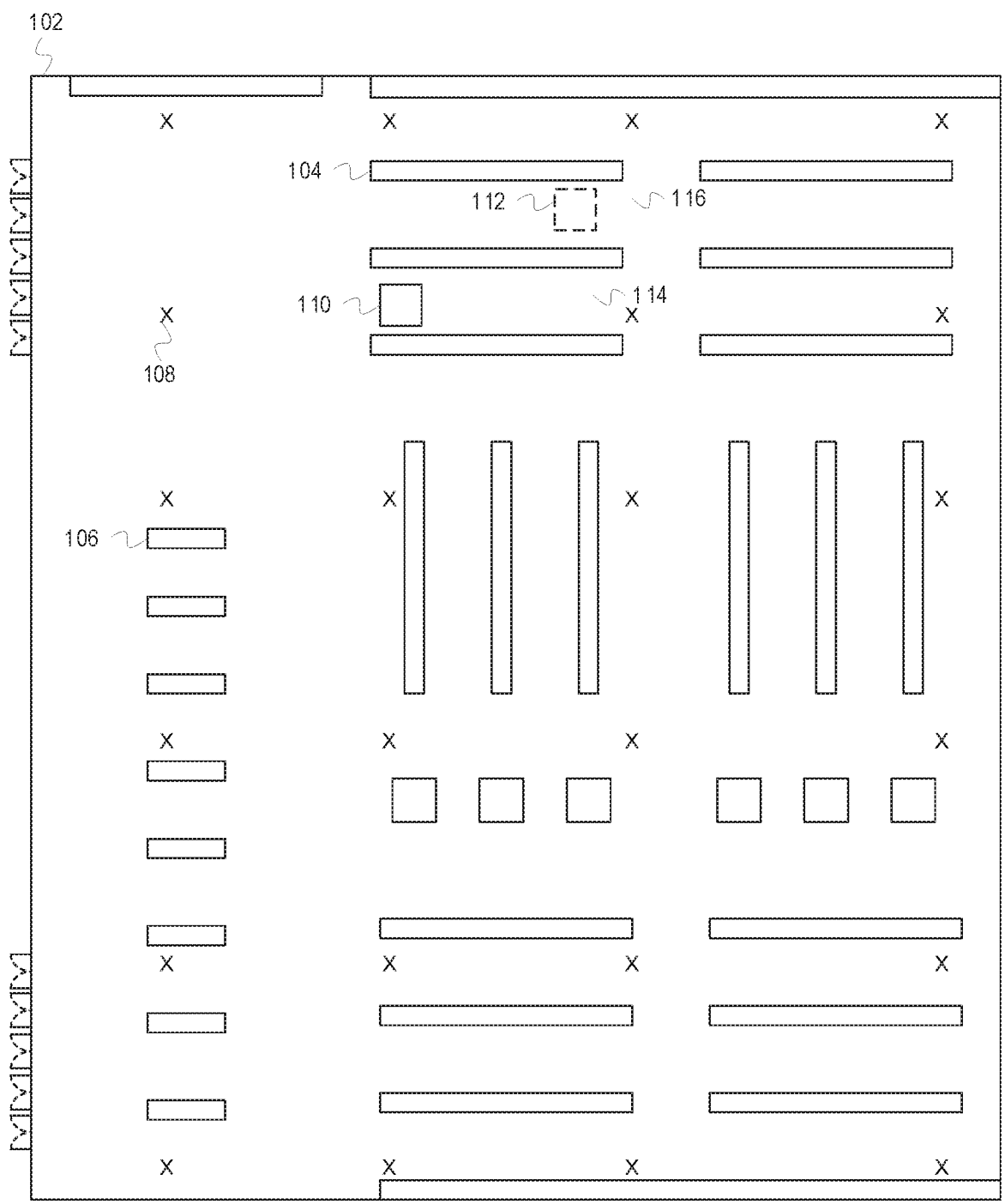
FIG. 1 is an overhead view of a retail facility 102 including RFID readers 108 and a product 110 including an RFID tag, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to monitoring locations of products in a facility. In some embodiments, a system comprises a plurality of RFID readers, wherein the plurality of RFID readers are placed at predetermined locations about the facility, a plurality of RFID tags, wherein the RFID tags are associated with products, and a control circuit communicatively coupled to the plurality of RFID readers, the control circuit configured to receive, from one or more of the plurality of RFID readers, an indication of an RFID read, determine, based on the indication of the RFID read, a product associated with the RFID read and a location of the product associated with the RFID read, compare the location of the product associated with the RFID read with locations of previous reads of a same type of item as the product, determine, based upon the locations of previous reads of the same type of item as the product, if the location of the product associated with the RFID read is consistent with the location of the previous reads.

As previously discussed, inventory management tasks are important in the day-to-day operations of retailers. Knowing what products are present in the retail facility and the locations of the products in the retail facility allows retailers to better serve customer needs. With regard to location, knowing the locations of products in the retail facility enables the retailer to quickly and confidently direct a customer to a desired product. Some retailers use a system of receivers and transmitters for inventory management purposes. The receivers can be located about the retail facility and the transmitters can be associated with products. The receivers receive signals from the transmitters (i.e., the receivers read the transmitters). While any now existing or not yet developed receivers and transmitters can be used with relation to this disclosure, the systems, methods, and apparatuses disclosed herein will be described with the use of RFID readers and RFID tags as receivers and transmitters, respectively. In this regard and by way of example, some retailers use RFID systems for inventory management purposes. Products include RFID tags and RFID readers are located about the retail facility. RFID signals transmitted to the RFID readers are used to determine the presence, and in some cases, location of products. Unfortunately, the usefulness of these RFID systems is limited by structures within the retail facility. For example, concrete structures can block RFID signals and metallic structures, such as product display units, can reflect RFID signals. This interference with RFID signals can make it difficult to read the RFID tags and determine a location of the RFID tag. As one example, reflection of an RFID signal may cause a product to appear in a location other than that in which it is currently located. Techniques exist that attempt to compensate for this inaccuracy (i.e., correct for the error in the location determination of RFID tags). For example, these error correction techniques are often based on received signal strength and utilize complicated mathematical models and assumptions about the locations and structures of objects. Because these techniques utilize complicated mathematical models and assumptions about locations and structures of objects, these techniques are error prone and complicated.

In some embodiments, the systems and methods described herein seek to compensate for errors in locating products not by attempting to calculate the true location of a product (i.e., not by using error correction), but rather by analyzing past RFID reads to determine consistency. For example, if RFID reads consistently indicate that Product A is located at Location X although a planogram indicates that Product A should be located at Location Y, it can be assumed that Product A is indeed at the correct location (Location Y) even though the RFID reads indicate that the product is at the incorrect location (Location X). Because the systems and method described herein do not utilize error correction to determine the location of products, in some embodiments, the systems and methods described herein are neither as error prone nor as complicated as the techniques utilizing error correction. Put simply, instead of trying to correct for error in RFID reads, the systems and methods described herein rely on consistency of reads to determine whether products are correctly located.

The discussion of FIG. 1 provides an overview of example systems and methods for monitoring the locations of products in a retail facility. It should be noted that although embodiments described herein refer to monitoring locations of products in a retail facility, similar systems and methods can be employed for other uses. For example, similar systems and method can be used to monitor the locations of items in a warehouse, shipping facility, office, etc.

FIG. 1 is an overhead view of a retail facility 102 including RFID readers 108 and a product 110 including an RFID tag, according to some embodiments. The RFID readers 108 are placed about the retail facility 102 and are part of an automated inventory management (AIM) system. In some embodiments, as pictured in FIG. 1, the RFID readers 108 are positioned in a grid pattern within the retail facility 102. The RFID readers 108 can be spaced at any appropriate interval, such as an approximate 40 to 50 foot interval. Additionally, depending on the layout of the retail facility 102, the RFID readers 108 can be positioned in places of known interference in an effort to minimize interference with RFID signals received from the RFID tags. For example, the RFID readers 108 can be placed above, between, next to, etc., product display units 104 or point-of-sale (POS) terminals 106.

The products in the retail facility 102 include RFID tags. For example, the product 110 includes an RFID tag within its packaging materials. The RFID tags can be passive RFID tags, active RFID tags, or a combination of passive and active RFID tags. The RFID tags transmit RFID signals to the RFID readers 108. The RFID signals indicate information about the product, such as a SKU associated with the product, a type of the product, timestamp information for the product, etc. Additionally, in some embodiments, the RFID signals can be used to calculate locations of products associated with the RFID reads. For example, the RFID reader 108 that reads the RFID signal, strength of the RFID signal, direction of the RFID signal, etc. can be used to determine the location of a product associated with the RFID signal. The locations can be coordinates (e.g., Cartesian or polar coordinates) or aisle locations (e.g., the product 110 is located in a first aisle 114). Additionally, in some embodiments, elevations can be determined based on the RFID signals, such as a Z coordinate in a Cartesian system or a shelf number in an aisle-based system.

As previously discussed, structures within and around the retail facility 102 may interfere with the RFID signals. For example, a structure, such as a pillar or product display unit 104, may block, reflect, or refract an RFID signal, altering the RFID read. Because of the altered RFID read, the location of the product with which the RFID tag is associated may appear to be in a different location than it is actually located (i.e., the RFID read may result in an erroneous location determination). In the example depicted in FIG. 1, the product 110 is located in the first aisle 114, but based on interference in the RFID signal, appears at a second location 112 in a second aisle 116. In some embodiments, RFID reads are tracked over time. These previous reads are then used to determine whether it is likely that the product is in the correct location. For example, the product 110 may be of a specific type, such as a red bowl. In the retail facility 102, red bowls are supposed to be located in the first aisle 114. However, over time, red bowls (i.e., the same type of product) are read consistently at a second location 112 in a second aisle 116. If the previous RFID reads for the product 110 at the second location are sufficient, it can be determined that the location of the product is consistent with the previous reads. In some embodiments, the number of previous reads can be compared to a consistency threshold. If the location based on the current read is consistent with the locations of previous reads, employees of the retail facility can feel confident that the product 110 is indeed in the correct location even though it appears the be at the second location 112. In other words, so long as the layout of the retail facility 102 does not change, the error in calculating the location of the product 110 should be consistent. Once a threshold has been reached, it is likely safe to assume that the product 110, although appearing to be in the wrong location, is in the correct location based on the fact that the product 110 repeatedly appears to be in the same wrong location.

The consistency threshold can be any suitable metric. As a simple example, the consistency metric can be a number of previous reads. For example, once the product 110 is determined to be at the second location 112 based on five reads, the consistency threshold is met and it is safe to assume that when the product 110 is read at the second location 112, it is in fact in the correct location. In other embodiments, the consistency threshold can be based on the specific retail facility 102. For example, if the retail facility 102 has a history of being well organized (i.e., the facility's previous adherence to a planogram is acceptable), it may take fewer previous reads than for a different facility that does not have a history of being well organized. Further, the consistency threshold can be based on the type of the product 110. For example, articles of clothing may historically be better organized than home goods and therefore require fewer reads for the consistency threshold to be met.

In addition to determining whether a consistency threshold is met, in some embodiments the location of the product 110, as well as locations of the same type of product based on previous RFID reads, can be logged in a database. Once the consistency threshold is met, the incorrect location (i.e., the second location 112) can be associated with the correct location based on a planogram. Based on the example provided in FIG. 1, the database could include an association between the second location 112 in the second aisle 116 and the correct location in the first aisle 114. Additionally, in some embodiments, the incorrect location can be translated to the correct location. For example, the database can include a mapping function that maps the second location 112 in the second aisle 116 to the correct location in the first aisle 114. Such associations and translations can be useful for automated systems. For example, an automated picking system can use the translated locations to retrieve items in the retail facility 102.

In some embodiments, a task to be performed can be determined based on the RFID reads. For example, if an item of the same type as the product 110 is determined to be at a location other than the second location 112, it can be determined that the item should be moved to the correct location. In some embodiments, a notification of the task is transmitted to an employee.

Figure 2:
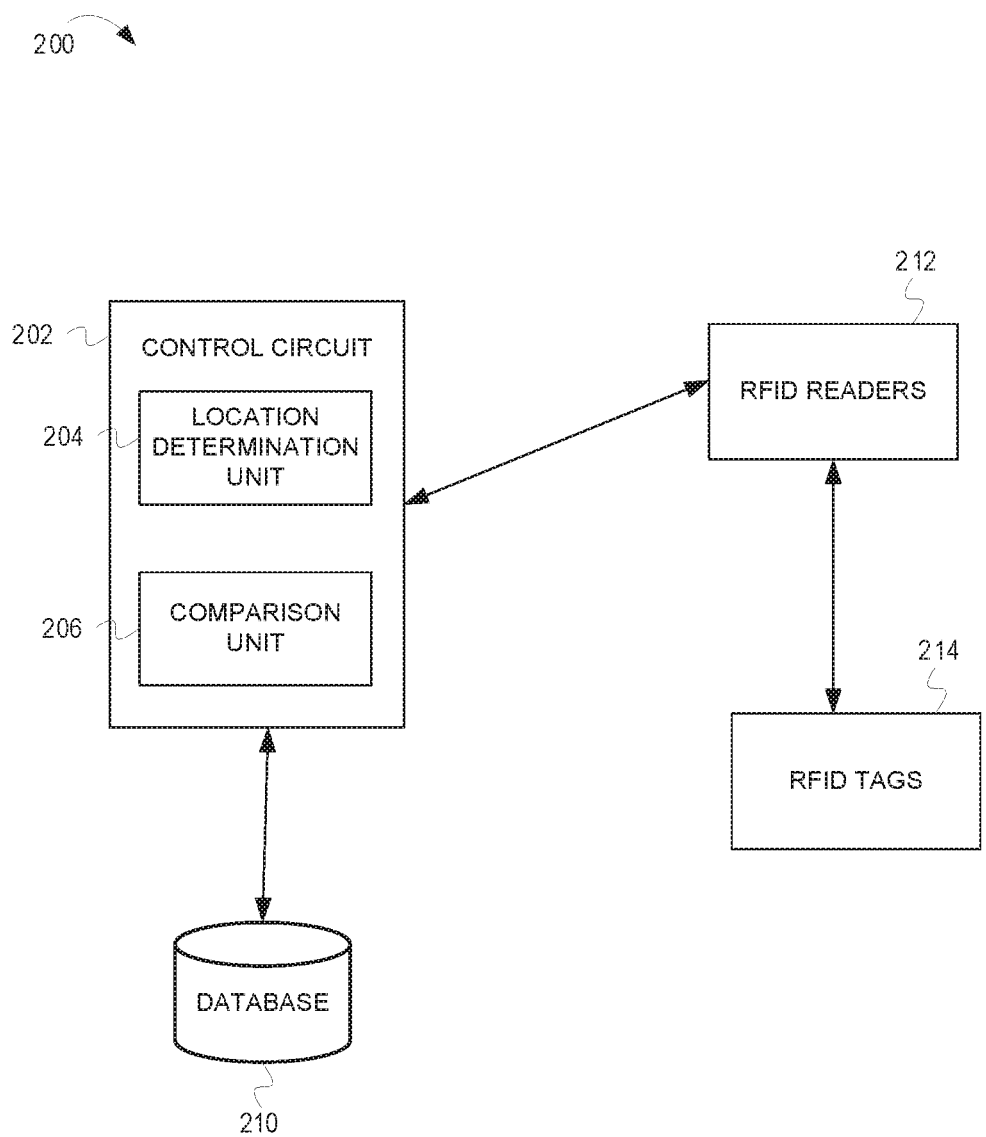
FIG. 2 is a block diagram of a system 200 for monitoring locations of products in a facility, according to some embodiments.

While the discussion of FIG. 1 provides an overview of a system for monitoring locations of a product in a retail facility, the discussion of FIG. 2 provides additional details about such a system.

FIG. 2 is a block diagram of a system 200 for monitoring locations of products in a facility, according to some embodiments. The system 200 includes RFID readers 212 and RFID tags 214. The RFID readers 212 are placed about a facility, such as a retail facility. For example, the RFID readers 212 can be placed in a pattern, such as a grid, or placed non-uniformly about the facility in a manner which ensures full coverage of the facility. The RFID reader 212 are configured to receive RFID signals (i.e., receive RFID reads) from the RFID tags 214. In the retail facility example, the RFID tags 214 are associated with products. For example, the RFID tags 214 can be integrated with the products or product packaging. The RFID tags 214 are encoded with information about the products with which they are associated. For example, the RFID tags 214 can be encoded with identifying information (e.g., a SKU), time-stamp information (e.g., batch or manufacture date information), information about a manufacturer or supplier, etc.

The RFID readers 212 are communicatively coupled to a control circuit 202. The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 receives indications of RFID reads from the RFID readers 212. The indications of the RFID reads include information about the product associated with the RFID read. The control circuit 202 includes a location determination unit 204. The location determination unit 204 determines a location of the product associated with the RFID read. That is, the location determination unit 204 calculates a location of the RFID tag 214 associated with the product with which the RFID is read is associated. The location determination unit 204 can calculate the location of the product associated with the RFID read based on a location of the RFID reader 212 that read the RFID tag 214, a direction of propagation of the RFID read, a signal strength of the RFID read, etc. The control circuit logs locations of products in a database 210. The database 210 includes information about RFID reads. For example, the database 210 can include locations of types products and types of items associated with the RFID reads.

The control circuit 202 also includes a comparison unit 206. The comparison unit determines if the location of the current read is consistent with previous reads. In some embodiments, the comparison unit determines if the read is consistent based on a consistency threshold. In such embodiments, the consistency threshold is met when conditions are met that indicates that a product is likely in the correct location. If RFID reads for a product match the expected location of a product (i.e., the RFID reads do not result in an erroneous location determination), it can be assumed that the product is in the correct location. If the RFID reads for a product match the expected location of the product, the consistency threshold may be quite low. For example, a single RFID read of a product in the correct location may satisfy the consistency threshold.

Alternatively, the RFID read may result in a location that is not the expected location of a product. For example, near then RFID readers 212 or the RFID tags 214 (e.g., structures in or around the facility) may interfere with the RFID reads. Such interference may cause an erroneous location determination based on the RFID reads. Because the structures causing the interference remain stationary, their impact on the RFID reads is relatively consistent. That is, if a product display unit interferes with an RFID read, that product display unit is likely to interfere with RFID reads originating from a same location in a similar manner. Consequently, erroneous locations based on RFID reads from the same location are likely to have the same error. For example, if RFID signals from Location X are interfered with by a product display unit, resulting in a location determination that the product associated with the RFID read is in Location Y, typically all reads for products in Location X will appear to have originated from Location Y. The comparison unit 206 compares the locations of products based on current and previous RFID reads in the database to determine if the consistency threshold is met. If the consistency threshold is met, it can be assumed that the product is in the correct location, regardless of whether the RFID reads indicate that the product is in the correct or expected location. If the consistency threshold is met, the control circuit 202 can indicate that the consistency threshold is met. For example, the control circuit 202 can log the indication that the consistency threshold is met in the database or transmit the indication that the consistency threshold is met (e.g., to an employee). In some embodiments, the control circuit 202 can also indicate that the consistency threshold is not met.

In some embodiments, the comparison unit 206 compares the locations to expected locations. The expected locations can be based on a map or planogram. If the locations do not match the expected locations, the control circuit 202 can associate the location with the expected location, translate the location to the expected location, update the planogram with an indication of the location, etc. Further, if the consistency threshold is met and an RFID read indicates that a product is not in the correct or expected location, the control circuit 202 can determine a task to perform, such as a zoning task.

Figure 3:
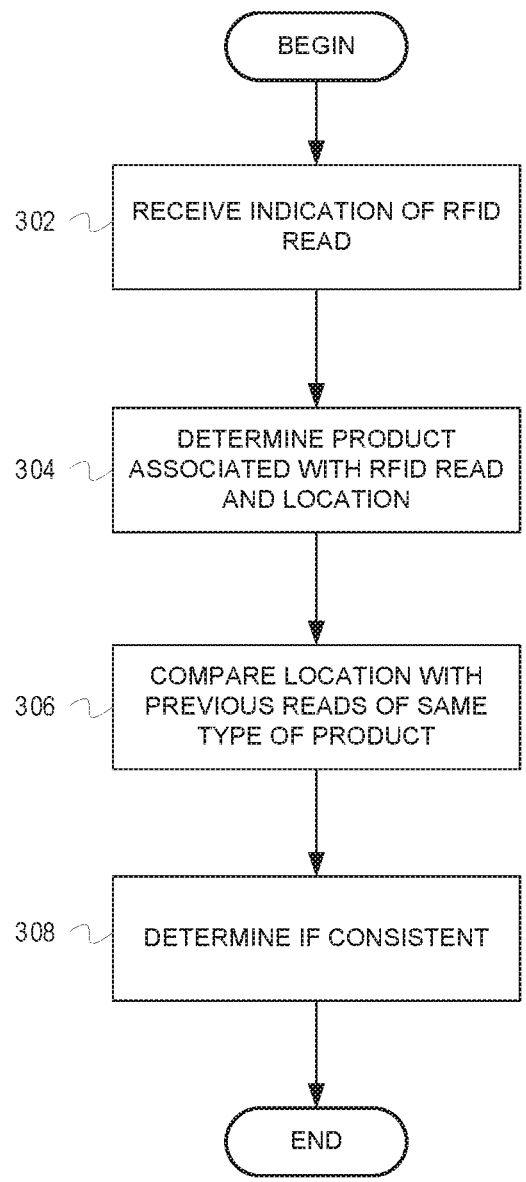
FIG. 3 is a flow chart depicting example operations for monitoring locations of products in a facility, according to some embodiments.

While the discussion of FIG. 2 provides additional details about a system for monitoring product locations in a facility, the discussion of FIG. 3 provides example operations of such a system.

FIG. 3 is a flow chart depicting example operations for monitoring locations of products in a facility, according to some embodiments. The flow begins at block 302.

At block 302, indications of RFID reads are received. For example, a control circuit can receive the indications of RFID reads. The control circuit receives the indications of RFID reads from RFID readers. The RFID readers are located about a facility, such as a retail facility. Items in the facility, such as products in a retail facility, include RFID tags. The RFID tags can be incorporated with the product or the products packaging. The RFID readers receive RFID signals (RFID reads) from the RFID tags. The flow continues at block 304.

At block 304, a product associated with an RFID read is determined. Additionally, a location of the product is determined. For example, the control circuit can determine the product and the location of the product. The indication of the RFID read can include information about the product, such as identifying information. The control circuit determines the product (e.g., an identity of the product) based on the indication of the RFID read. The control circuit determines the location of the product based on the indication of the RFID read. For example, the control circuit can determine the location of the product based on the strength of the RFID signal, a location from which the RFID signal originated, the RFID reader that read the RFID tag, etc. The flow continues at block 306.

At block 306, the location of the product is compared to previous RFID reads of the same type of product (e.g., items with the same stocking keeping unit (SKU), item number, product code, identifier, etc.). For example, the control circuit can compare the location of the product with locations based on previous RFID reads of the same type of product. In some embodiments, locations of previous reads are stored in a database. The control circuit accesses the database and compares the location of the product with the locations of previous reads. Additionally, the control circuit can log the current location in the database to increase the number of data points in the database. The flow continues at block 308.

At block 308, it is determined if the current location is consistent with the locations of previous reads. For example, the control circuit can determine if the current location is consistent with the locations of the previous reads. In some embodiments, the control circuit makes this determination based on a consistency threshold. The consistency threshold can be a number of previous reads. For example, after seven reads of a product at a location are received, the consistency threshold can be met. In some embodiments, the consistency threshold can also be based on a type of product, a location of a product, a facility in which the product is located, etc.

In some embodiments, a system comprises a plurality of RFID readers, wherein the plurality of RFID readers are placed at predetermined locations about the facility, a plurality of RFID tags, wherein the RFID tags are associated with products, and a control circuit communicatively coupled to the plurality of RFID readers, the control circuit configured to receive, from one or more of the plurality of RFID readers, an indication of an RFID read, determine, based on the indication of the RFID read, a product associated with the RFID read and a location of the product associated with the RFID read, compare the location of the product associated with the RFID read with locations of previous reads of a same type of item as the product, determine, based upon the locations of previous reads of the same type of item as the product, if a consistency threshold is met, and in response to a determination that the consistency threshold is met, indicate that the consistency threshold is met.

In some embodiments, an apparatus and a corresponding method performed by the apparatus comprises receiving, from one or more of a plurality of RFID readers placed at predetermined locations about the facility, an indication of an RFID read, determining, based on the indication of the RFID read, a product associated with the RFID read and a location of the product associated with the RFID read, comparing the location of the product associated with the RFID read with locations of previous reads of a same type of item as the product associated with the RFID read, determining, based upon the locations of previous reads of the same type of item as the product, if the location of the product associated with the RFID read is consistent with the location of the previous reads.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring locations of products in a facility, the system comprising:
   a plurality of receivers, wherein the plurality of receivers are placed at predetermined locations about the facility;
   a plurality of transmitters, wherein the transmitters are associated with products; and
   a control circuit communicatively coupled to the plurality of receivers, the control circuit configured to:
      receive, from one or more of the plurality of receivers, an indication of a read;
      determine, based on the indication of the read, a product associated with the read and a location of the product associated with the read, wherein the location of the product is not determined based on error correction;
      compare the location of the product associated with the read with locations of previous reads of a same type of item as the product associated with the read; and
      determine, based upon the locations of previous reads of the same type of item as the product, if the location of the product associated with the read is consistent with the locations of the previous reads, wherein if the location of the product associated with the read is consistent with the locations of the previous reads a consistency threshold is met and wherein the consistency threshold is met when the location of the product associated with the read matches the locations of previous reads of a same type of item as the product and a predetermined number of previous reads of a same type of item as the product have been performed.

2. The system of claim 1, wherein the consistency threshold is based, at least in part, on the facility in which the product associated with the read is located.

3. The system of claim 2, wherein the consistency threshold is based, at least in part, on the facility's previous adherence to a planogram.

4. The system of claim 3, wherein the facility's previous adherence to the planogram is specific to a type of product of the product associated with the read.

5. The system of claim 1, wherein the control circuit is further configured to:
   determine, based on a planogram, an expected location for the product associated with the read; and
   associate, in a database, the location of the product associated with the read and the expected location of the product associated with the read.

6. The system of claim 5, wherein the control circuit is further configured to:
   translate the location of the product associated with the read to the expected location of the product associated with the read.

7. The system of claim 1, wherein the control circuit is further configured to:
   determine that the location of the product associated with the read is not consistent with the previous reads of a same type of item as the product; and
   determine that a zoning task is required.

8. The system of claim 1, wherein the plurality receivers are located in a grid format.

9. The system of claim 1, wherein if the location of the product associated with the read is consistent with the locations of the previous reads, an indication of the consistency is logged in a database.

10. A method for monitoring locations of products in a facility, the method comprising:
    receiving, from one or more of receivers placed at predetermined locations about the facility, an indication of a read;
    determining, based on the indication of the read, a product associated with the read and a location of the product associated with the read, wherein the location of the product is not determined based on error correction;
    comparing the location of the product associated with the read with locations of previous reads of a same type of item as the product associated with the read; and
    determining, based upon the locations of the previous reads of the same type of item as the product, if the location of the product associated with the read is consistent with the locations of the previous reads, wherein if the location of the product associated with the read is consistent with the locations of the previous reads a consistency threshold is met and wherein the consistency threshold is met when the location of the product associated with the read matches the locations of previous reads of a same type of item as the product and a predetermined number of previous reads of a same type of item as the product have been performed.

11. The method of claim 10, wherein the consistency threshold is based, at least in part, on a facility in which the product associated with the read is located.

12. The method of claim 11, wherein the consistency threshold is based, at least in part, on the facility's previous adherence to a planogram.

13. The method of claim 12, wherein the facility's previous adherence to the planogram is specific to a type of product of the product associated with the read.

14. The method of claim 10, further comprising:
    determining, based on a planogram, an expected location for the product associated with the read; and
    associating, in a database, the location of the product associated with the read and the expected location of the product associated with the read.

15. The method of claim 14, further comprising:
    translating the location of the product associated with the read to the expected location of the product associated with the read.

16. The method of claim 10, further comprising:
    determining that the location of the product associated with the read is not consistent with the previous reads of a same type of item as the product; and
    determining that a zoning task is required.

17. The method of claim 10, wherein the plurality of receivers are located in a grid format.

18. The method of claim 10, wherein the indicating that the consistency threshold is met comprises logging, in a database, that the consistency threshold is met.

19. A system for monitoring locations of products in a facility, the system comprising:
    a plurality of receivers, wherein the plurality of receivers are placed at predetermined locations about the facility;
    a plurality of transmitters, wherein the transmitters are associated with products; and
    a control circuit communicatively coupled to the plurality of receivers, the control circuit configured to:
      receive, from one or more of the plurality of receivers, an indication of a read;
      determine, based on the indication of the read, a product associated with the read and a location of the product associated with the read, wherein the location of the product is not determined based on error correction;
      determine, based on the location of the product associated with the read, that the product appears to be incorrectly located;
      compare the location of the product associated with the read with locations of previous reads of a same type of item as the product associated with the read; and
      determine, based on a consistency between the locations of previous reads of the same type of item as the product and the location of the product associated with the read, that the product is correctly located.

* * * * *